United States Patent
Toyama (10) Patent No.: US 10,234,652 B2
(45) Date of Patent: *Mar. 19, 2019

(54) ZOOM LENS DEVICE AND METHOD FOR CONTROLLING SAME

(71) Applicant: FUJIFILM Corporation, Tokyo (JP)

(72) Inventor: Nobuaki Toyama, Saitama (JP)

(73) Assignee: FUJIFILM Corporation, Tokyo (JP)

(*) Notice: Subject to any disclaimer, the term of this patent is extended or adjusted under 35 U.S.C. 154(b) by 79 days.

This patent is subject to a terminal disclaimer.

(21) Appl. No.: 15/235,371

(22) Filed: Aug. 12, 2016

(65) Prior Publication Data

US 2016/0349479 A1    Dec. 1, 2016

Related U.S. Application Data

(63) Continuation of application No. PCT/JP2015/056639, filed on Mar. 6, 2015.

(30) Foreign Application Priority Data

Mar. 31, 2014    (JP) .................. 2014-071029

(51) Int. Cl.
*G02B 7/10* (2006.01)
*G02B 7/04* (2006.01)
(Continued)

(52) U.S. Cl.
CPC ............ *G02B 7/102* (2013.01); *G02B 7/04* (2013.01); *G02B 7/08* (2013.01); *G02B 15/16* (2013.01);
(Continued)

(58) Field of Classification Search
None
See application file for complete search history.

(56) References Cited

U.S. PATENT DOCUMENTS

| 4,733,945 A | * | 3/1988 | Bacich | G03F 7/70825 |
| | | | | 359/820 |
| 2010/0033839 A1 | * | 2/2010 | Fujisaki | G02B 15/173 |
| | | | | 359/687 |
| 2013/0222924 A1 | | 8/2013 | Kawamura | |

FOREIGN PATENT DOCUMENTS

| JP | 9-35322 A | 2/1997 |
| JP | 9-184951 A | 7/1997 |

(Continued)

OTHER PUBLICATIONS

International Search Report for PCT/JP2015/056639 (PCT/ISA/210) dated Jun. 2, 2015.

(Continued)

*Primary Examiner* — Darryl J Collins
(74) *Attorney, Agent, or Firm* — Birch, Stewart, Kolasch & Birch, LLP (57) ABSTRACT

Provided are a zoom lens device and a method for controlling the device, capable of reducing astigmatism regardless of the position of the zoom lens. In accordance with a zoom command, a lens constituting a zoom optical system is moved in the direction of the optical axis (step 81). The position of the moved lens is detected (step 82), and an amount of rotation corresponding to the detected position of the moved lens is read from a table that is stored (step 83). The lens is rotated by the read amount of rotation (step 84). As a result of the rotation of the lens, astigmatism in the zoom optical system is reduced.

15 Claims, 5 Drawing Sheets

(51) Int. Cl.
*G02B 7/08* (2006.01)
*G02B 15/16* (2006.01)
*G03B 5/00* (2006.01)
*G02B 27/00* (2006.01)

(52) U.S. Cl.
CPC ........... *G02B 27/0025* (2013.01); *G03B 5/00* (2013.01); *G03B 2205/0046* (2013.01)

(56) References Cited

FOREIGN PATENT DOCUMENTS

| | | |
|---|---|---|
| JP | 2007-80318 A | 3/2007 |
| JP | 2014-44319 A | 3/2014 |
| WO | WO 2012/046450 A1 | 4/2012 |

OTHER PUBLICATIONS

Written Opinion of the International Searching Authority for PCT/JP2015/056639 (PCT/ISA/237) dated Jun. 2, 2015.

\* cited by examiner

| POSITION | P1 | P2 | P3 | P4 | ...... |
|---|---|---|---|---|---|
| ROTATION ANGLE | $\theta 1$ | $\theta 2$ | $\theta 3$ | $\theta 4$ | ...... |

ZOOM LENS DEVICE AND METHOD FOR CONTROLLING SAME

CROSS-REFERENCE TO RELATED APPLICATIONS

This application is a Continuation of PCT International Application No. PCT/JP2015/056639 filed on Mar. 6, 2015, which claims priority under 35 U.S.C. § 119(a) to Japanese Patent Application No. 2014-071029 filed Mar. 31, 2014. Each of the above application(s) is hereby expressly incorporated by reference, in its entirety, into the present application.

BACKGROUND OF THE INVENTION

1. Field of the Invention

This invention relates to a zoom lens device and a method for controlling the device.

2. Description of the Related Art

In zoom lens devices, at the time of fabrication of lenses, astigmatism occurs to a degree of 0.1 in terms of Newton stripes. In the past, at the time of assembly of a zoom lens, astigmatism has been reduced (WO2012/046450A). However, in a zoom lens superior to that in a high-definition television broadcast system, in a case of continuously changing a zoom ratio, an effect of astigmatism is not negligible.

SUMMARY OF THE INVENTION

This invention has an object to reduce astigmatism.

This invention provides a zoom lens device that includes a plurality of zoom lens groups each of which is formed of two or more lenses, the zoom lens device comprising: a lens rotating mechanism that rotates at least one lens of two or more lenses, which constitute the zoom lens groups and that an optical axis is common in the optical axis of the zoom lens group, about an optical axis of the zoom lens groups, relative to lenses other than the at least one lens of the zoom lens groups; a zoom lens group driving mechanism that moves at least one zoom lens group among the plurality of zoom lens groups, which are included in the zoom lens device, in a direction of the optical axis, in response to a zoom command; and a control mechanism that controls the lens rotating mechanism such that the at least one lens is rotated about the optical axis by a rotation angle corresponding to a position of the zoom lens group in the direction of the optical axis.

This invention also provides a method for controlling a zoom lens device. That is, there is provided a method for controlling a zoom lens device that includes a plurality of zoom lens groups each of which is formed of two or more lenses, the method comprising: causing a lens rotating mechanism to rotate at least one lens of two or more lenses, which constitute the zoom lens groups and that an optical axis is common in the optical axis of the zoom lens group, about an optical axis of the zoom lens groups, relative to lenses other than the at least one lens of the zoom lens groups; causing a zoom lens group driving mechanism to move at least one zoom lens group among the plurality of zoom lens groups, which are included in the zoom lens device, in a direction of the optical axis, in response to a zoom command; and causing a control mechanism to control the lens rotating mechanism such that the at least one lens is rotated about the optical axis by a rotation angle corresponding to a position of the zoom lens group in the direction of the optical axis.

For example, the lens rotating mechanism rotates two lenses which are a first lens and a second lens adjacent to each other.

The first lens may be disposed to be closer to a subject side than the second lens is. The first lens may have two optical function surfaces which are curved surfaces, and an optical function surface of the two optical function surfaces, which has a larger difference between a maximum value and a minimum value of curvatures of the curved surfaces in a direction of circumference centered on the optical axis, may be set to be closer to the subject side. The second lens may have two optical function surfaces which are curved surfaces, and an optical function surface of the two optical function surfaces, which has a larger difference between a maximum value and a minimum value of curvatures of the curved surfaces in a direction of circumference centered on the optical axis, may be set to be closer to an image side.

The first lens may be disposed to be closer to a subject side than the second lens is. The first lens may have two optical function surfaces which are curved surfaces, and an optical function surface of the two optical function surfaces, which has a larger difference between a maximum value and a minimum value of curvatures of the curved surfaces in a direction of circumference centered on the optical axis, may be set to be closer to an image side. The second lens may have two optical function surfaces which are curved surfaces, and an optical function surface of the two optical function surfaces, which has a larger difference between a maximum value and a minimum value of curvatures of the curved surfaces in a direction of circumference centered on the optical axis, may be set to be closer to the subject side.

For example, the lens rotating mechanism rotates the first lens and the second lens in directions opposite to each other.

The lens, which is rotated by the lens rotating mechanism, may have a relatively large astigmatism, among the lenses constituting the zoom lens device.

The lens, which is rotated by the lens rotating mechanism, may be a lens which has a value of astigmatism larger than an average value of astigmatism of the lenses constituting the zoom lens device, or a lens which has a value of astigmatism larger than a median value of astigmatism of the lenses constituting the zoom lens device.

It is preferable that an amount of rotation of the lens, which is rotated by the lens rotating mechanism, is determined in accordance with an amount of zooming of the zoom lens device such that a value of astigmatism of the entire zoom lens device decreases.

Movement of at least one zoom lens group moved by the zoom lens group driving mechanism may interlock with rotation of at least one lens rotated by the lens rotating mechanism.

The lens rotating mechanism may rotate at least two lenses, and the at least two lenses may constitute the same zoom lens group.

The lens rotating mechanism may rotate at least two lenses, and the at least two lenses may constitute the zoom lens groups which are different.

The lens, which is rotated by the lens rotating mechanism, may be a single lens, and the single lens may be rotated in a range of a rotation angle of 180 degrees.

The lens rotating mechanism may rotate the first lens in a range of a rotation angle of 90 degrees, and may rotate the second lens in a range of a rotation angle of 90 degrees in a direction opposite to a direction of rotation of the first lens.

The lens rotating mechanism may rotate a lens having a curved surface, of which a curvature is a maximum value, and a lens having a curved surface, of which a curvature is a minimum value, among two or more lenses constituting the zoom lens groups.

According to this invention, at least one lens is rotated about the optical axis by the rotation angle corresponding to the position of the zoom lens group in the direction of the optical axis. Even in a case where the zoom lens group is moved in the direction of the optical axis, it is possible to rotate the lens by the rotation angle which is set such that astigmatism is reduced in accordance with the movement. Regardless of the position of the zoom lens group, it is possible to reduce astigmatism.

DESCRIPTION OF THE PREFERRED EMBODIMENTS

Figure 1:
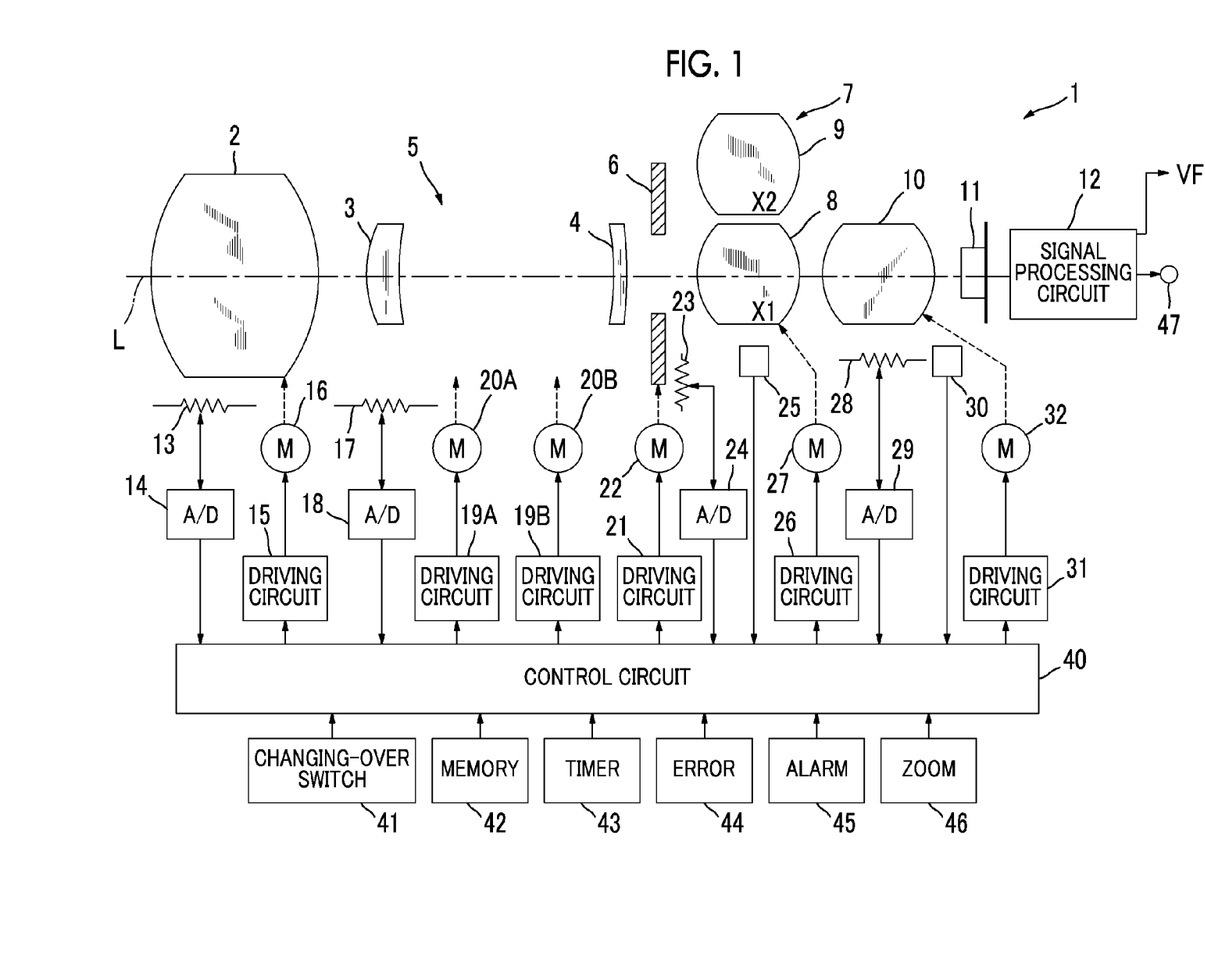
FIG. 1 shows an optical configuration and an electrical configuration of a television camera lens.

FIG. 1 is a block diagram illustrating an electrical configuration of a television camera lens (lens device) 1 having a zoom lens device.

All operations of the television camera lens 1 are integrally controlled by a control circuit 40.

The television camera lens 1 includes an imaging element 11. A focus optical system 2 including a single or a plurality of lenses, a zoom optical system (zoom lens device) 5 that changes a zoom ratio, a diaphragm 6, an extender lens (group) 7, and a master optical system 10 including a single or a plurality of lenses are disposed in front of the imaging element 11. The optical axis L of the television camera lens 1 passes through centers of the light receiving surfaces of a focus optical system 2, a zoom optical system 5, a diaphragm 6, a master optical system 10, and an imaging element 11. The zoom optical system 5 includes a single or a plurality of variable power system lenses 3 and a single or plurality of correction system lenses 4. In the extender lens 7, an imaging lens 8 having an imaging magnification of 1× and an imaging lens 9 having an imaging magnification of 2× are mounted on a turret board (not shown in the drawing). The turret board of the extender lens 7 rotates in accordance with a switching control signal issued from a changing-over switch 41. Then, either one of the imaging lens 8 having a magnification of 1× or the imaging lens 9 having a magnification of 2× is positioned on the optical axis L.

A detector 13 detects lens positions of the lenses included in the focus optical system 2. A detection signal, which indicates the lens positions of the lenses included in the focus optical system 2 detected by the detector 13, is converted into digital detection data in an analog/digital conversion circuit 14, and is input to the control circuit 40.

A user sets an amount of focus by turning a focus ring (not shown in the drawing). The control circuit 40 compares the set amount of focus and the detected lens positions of the lenses included in the focus optical system 2 represented by the digital detection data. On the basis of the result of the comparison, data, which indicates an amount of driving of the lenses included in the focus optical system 2, is generated. The data, which indicates the generated amount of driving, is given to the driving circuit 15, and the driving circuit 15 controls a focus motor 16. Thereby, the lens positions of the lenses included in the focus optical system 2 are adjusted.

The variable power system lens 3 (a zoom lens group constituted of two or more lenses) constituting the zoom optical system 5 changes a focal length, and the correction system lens 4 (a zoom lens group constituted of two or more lenses) performs correction so as not to change the focal position. If a zoom command issued from a zoom button 46 is given to the control circuit 40, the control circuit 40 controls a driving circuit 19A, and causes the motor 20A to rotate. The motor 20A moves at least one of the variable power system lens 3 or the correction system lens 4 on the optical axis L. As might be expected, by rotating a zoom cam barrel (not shown in the drawing) that rotates in accordance with rotation of a zoom ring (not shown in the drawing) operated by a user, the variable power system lens 3 and the correction system lens 4 may be moved along the optical axis L in a fixed relationship. The detector 17 detects positions of the variable power system lens 3 and the correction system lens 4, which constitutes the zoom optical system 5, in the direction of the optical axis. The detection signal, which is output from the detector 17, is converted into the digital detection data in the analog/digital conversion circuit 18, and is input to the control circuit 40. The control circuit 40 compares an amount of zooming, which is set using a zoom ring, and the detected lens positions of the lenses included in the zoom optical system 5 represented by the digital detection data. On the basis of the result of the comparison, data, which indicates an amount of driving of the lenses included in the zoom optical system 5, is generated. The data, which indicates the generated amount of driving, is given to the driving circuit 19A, and the driving circuit 19A controls a zoom motor 20A. Thereby, the lens positions of the variable power system lens 3 and the correction system lens 4 constituting the zoom optical system 5 are adjusted. In FIG. 1, each of the variable power system lens 3 and the correction system lens 4 is shown as a single lens. However, it is needless to say that each of the lenses is formed of a plurality of lenses. As necessary, there is provided a plurality of detectors 17 corresponding to the plurality of lenses, and the above-mentioned control is performed. The driving circuit 19A, the zoom motor 20A, and the control circuit 40 serve as a zoom lens group driving mechanism that moves at least one zoom lens group among a plurality of zoom lens groups, which are included in the zoom optical system 5 (zoom lens device), in the direction of the optical axis, in response to the zoom command.

In this example, the lenses included in the zoom optical system 5 are rotated about the optical axis L. Hence, the television camera lens 1 includes a driving circuit 19B and a motor 20B. The driving circuit 19B drives the motor 20B, whereby it is possible to rotate a desired lens, which is included in the zoom optical system 5, about the optical axis L.

The detector 23 detects an amount of aperture of the diaphragm 6. The detection signal, which is output from the detector 23, is converted into the digital detection data by the analog/digital conversion circuit 24, and is input to the control circuit 40. Further, data, which indicates an amount of driving, is generated in accordance with an amount of rotation of a diaphragm ring (not shown in the drawing) operated by a user. The data, which indicates the generated amount of driving, and the data, which indicates the detected amount of driving, are compared. On the basis of the result of the comparison, data, which indicates the amount of driving of the diaphragm 6, is generated. The data, which indicates the generated amount of driving, is given to the driving circuit 21, and the driving circuit 21 controls a diaphragm motor 22. Thereby, the diaphragm 6 is set at a desired aperture value.

A photo interrupter (detector) 25 is provided in the vicinity of the extender lens 7. The photo interrupter 25 detects whether either one of imaging lenses 8 or 9 constituting the extender lens 7 is positioned on the optical axis L. An output signal issued from the photo interrupter 25 is input to the control circuit 40, and it is detected whether the imaging lens 8 or 9 designated by the changing-over switch 41 is positioned on the optical axis L. If the imaging lens 8 or 9 designated by the changing-over switch 41 is positioned on the optical axis L, the designated imaging lens 8 or 9 is positioned on the optical axis L, and the driving data is generated by the control circuit 40, and is given to the driving circuit 26. The driving circuit 26 controls the extender motor 27 such that the imaging lens 8 or 9 is positioned on the optical axis L.

A flange-back adjustment knob 30, which is for setting an amount of adjustment of the master optical system 10 including a single or a plurality of lenses, is provided. Data, which indicates the amount of adjustment that is set by the knob 30, is input to the control circuit 40. Further, a detection signal, which is output from a potentiometer (detector) 28 that detects the amount of movement of the master optical system 10, is input to the analog/digital conversion circuit 29, is converted into digital detection data, and is input to the control circuit 40. The data, which indicates the amount of adjustment that is set by the knob 30, and the digital detection data, which indicates the amount of movement of the master optical system 10, are compared in the control circuit 40. On the basis of the result of the comparison, the driving data is generated. The generated driving data is given to the driving circuit 31, and the master lens motor 32 is driven. The master optical system 10 moves along the optical axis L, whereby focus correction is performed such that a subject image is in focus on the imaging surface of the imaging element 11.

A video signal, which is output from the imaging element 11, is input to the signal processing circuit 12, and signal processing such as sampling processing, white color balance adjustment, and gamma correction is performed, whereby a television signal is generated. The generated television signal is output to a viewfinder, is reproduced thereon, and is given to an output terminal 47.

The control circuit 40 is connected with a memory 42, a timer 43 that measures date and time, an error LED 44 that emits light in order to notify a user or the like that the optical system constituting the television camera lens 1 fails, and a warning LED 45 that emits light in order to give a warning when failure is highly likely to occur.

Figure 2:
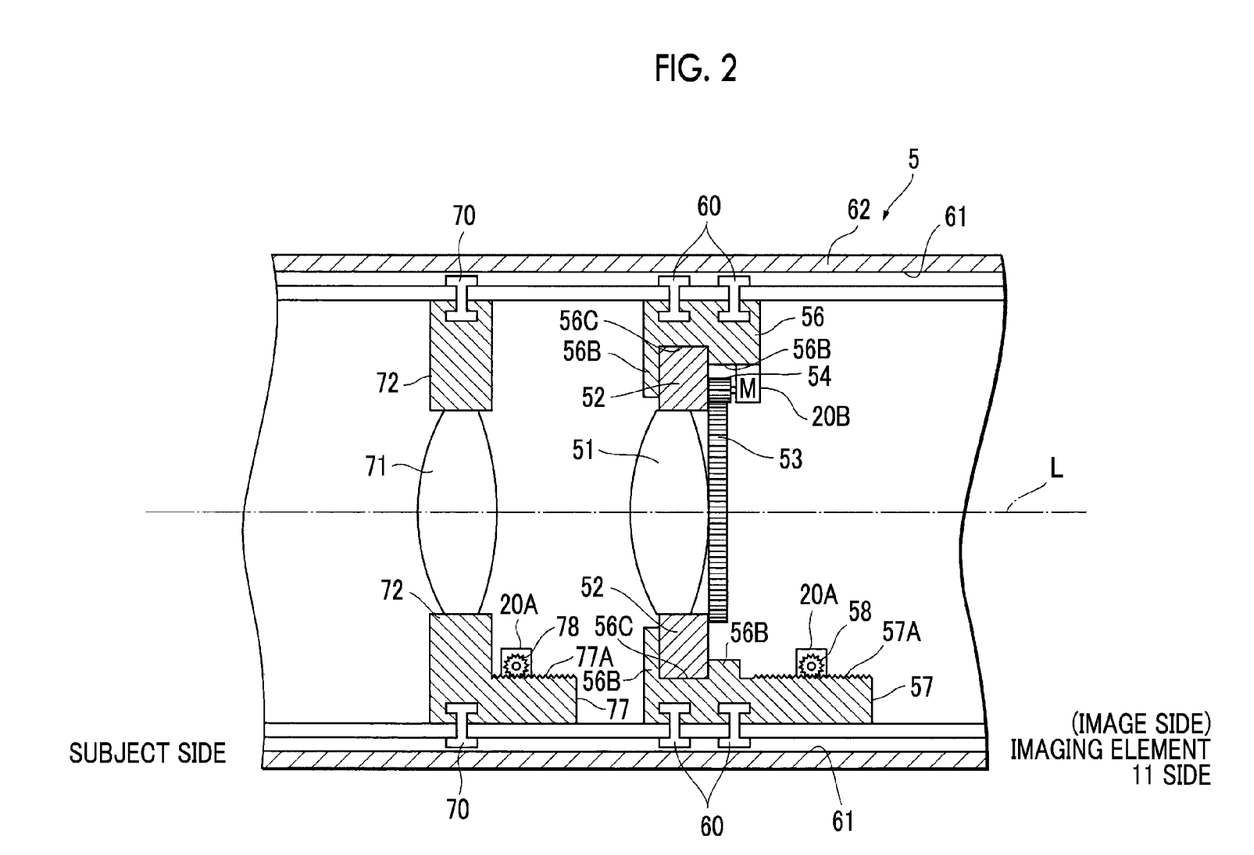
FIG. 2 shows a lens rotating mechanism and a zoom lens group driving mechanism.
Figure 3:
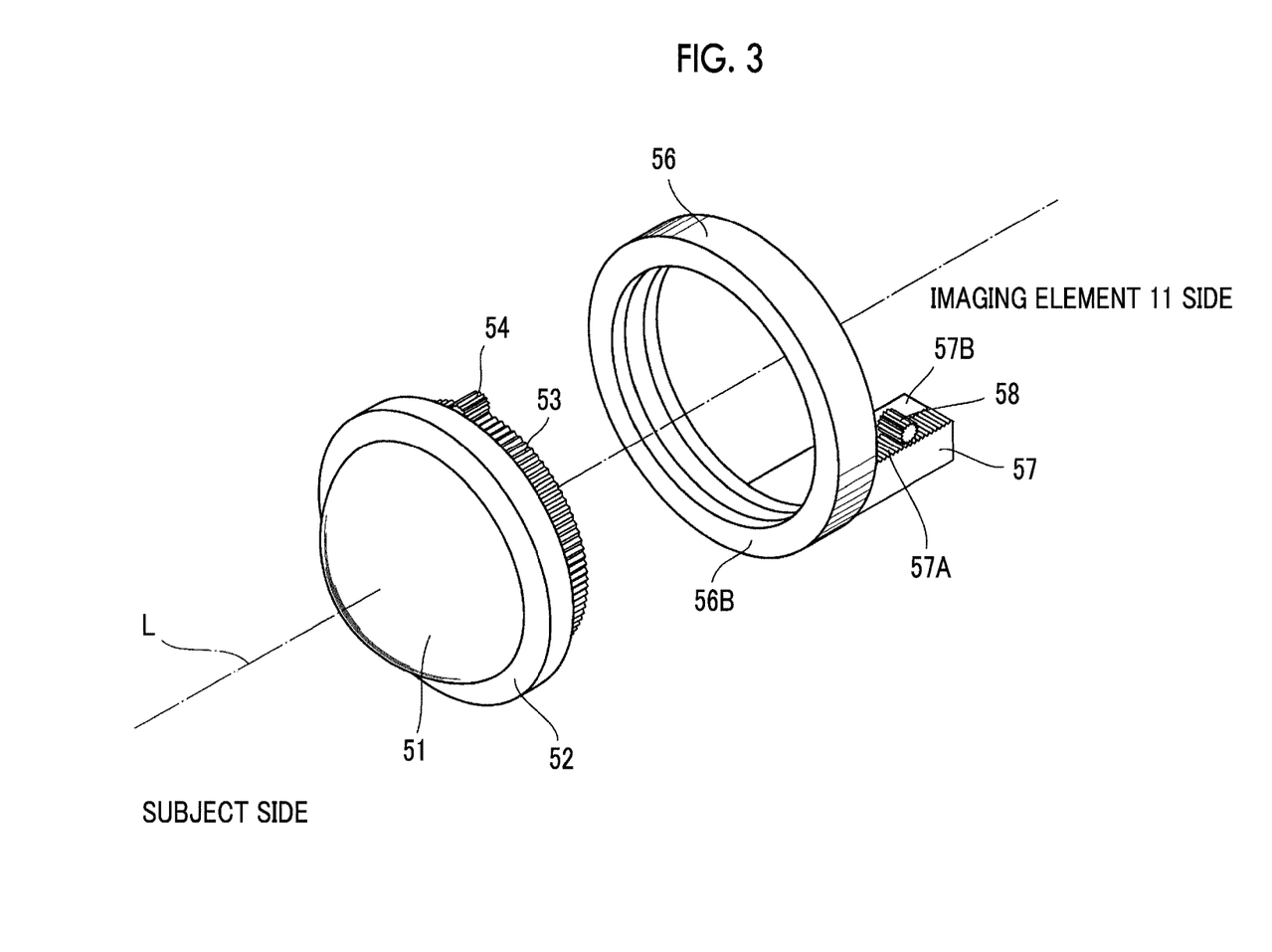
FIG. 3 is an exploded perspective view of a lens, a lens fixing frame, and a lens holding frame.
Figure 4:
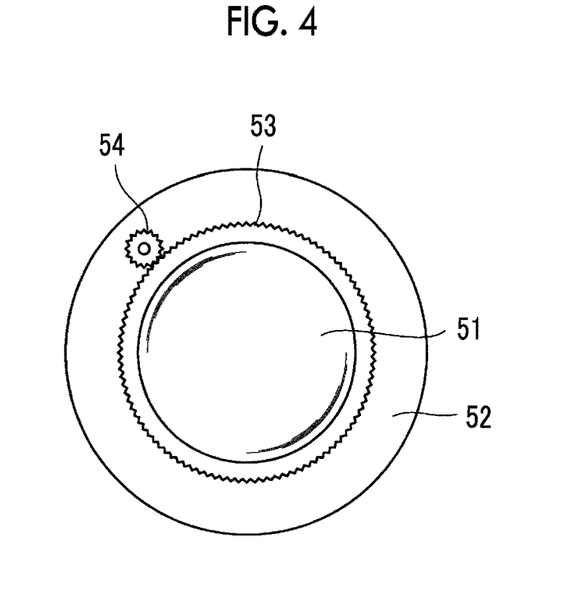
FIG. 4 is a rear view of a lens onto which a lens fixing frame is fixed.
Figure 5:
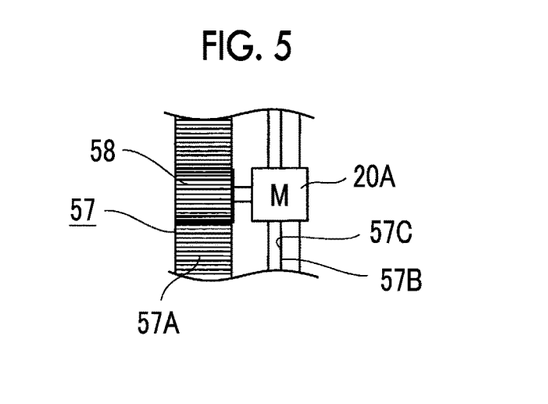
FIG. 5 is a plan view illustrating a rack.

FIG. 2 is a partial sectional view of the zoom optical system 5. FIG. 3 is an exploded perspective view of a lens 51 and the like included in the zoom optical system 5. FIG. 4 is a rear view of the lens 51 and the like viewed from the side of the imaging element 11. FIG. 5 is a plan view illustrating parts constituting a part of a lens moving mechanism that moves the lens 51 and the like in a direction of the optical axis L.

A lens fixing frame 52, of which the inner peripheral surface is fixed onto the outer peripheral surface of the lens 51, is mounted on the outer peripheral surface of the lens 51. A gear 53 is formed to be close to the inner side than the outer peripheral surface of the lens fixing frame 52 in a circumferential direction, in a section of the lens fixing frame 52 on the imaging element 11 side (refer to FIG. 4).

A lens holding frame 56 surrounding the outer periphery of the lens fixing frame 52 is provided. As shown in FIG. 2, two flanges 56B are formed in the direction of the optical axis L with an inner peripheral surface 56C of the lens holding frame 56 interposed therebetween. The flanges 56B enables the lens 51 (lens fixing frame 52) to rotate about the optical axis L without shift in the direction of the optical axis L relative to the lens holding frame 56. A ball bearing may be provided between the inner peripheral surface 56C of the lens holding frame 56 and the outer peripheral surface of the lens fixing frame 52. The lens 51 smoothly rotates.

The motor 20B is fixed onto the lens holding frame 56, and the gear 54 is fixed onto the shaft of the motor 20B. The gear 54 engages with the gear 53 of the lens fixing frame 52. By driving the motor 20B, the lens fixing frame 52 rotates, and thereby the lens 51 rotates about the optical axis L.

One end of a plurality of pins 60 is fixed onto the lens holding frame 56. The other end of these pins 60 is inserted into a guiding groove 61 which is formed in a barrel 62 of the zoom optical system 5. The guiding groove 61 is formed in the direction of the optical axis L. by moving the pins 60 along the guiding groove 61, the lens holding frame 56 (lens 51) moves in the direction of the optical axis L.

A rack 57, which protrudes in the direction of the optical axis L, is formed on a part of the lens holding frame 56. Teeth 57A formed on the rack 57 engages with a pinion 58. A shaft of the above-mentioned motor 20A is fixed onto the pinion 58.

Referring to FIG. 5, the rack 57 includes a part in which the teeth 57A are formed and a part 57B in which the teeth 57A are not formed. The motor 20A is disposed on the part 57B in which the teeth 57A are not formed. The guiding groove 57C is formed in the direction of the optical axis L in the part 57B in which the teeth 57A are not formed, and a regulation pin (not shown in the drawing), which protrudes downward (downward in FIG. 2) from the motor 20A, is inserted into the guiding groove 57C. If the motor 20A is driven, the pinion 58 rotates, and the rack 57 moves in the direction of the optical axis L. Therefore, the lens 51 also moves in the direction of the optical axis L. The motor 20A is fixed onto the part 57B in which the teeth 57A of the rack 57 are not formed, and is fixed onto the inner peripheral surface of the barrel 62. The motor 20A does not move together with the rack 57, and the lens 51 moves in the direction of the optical axis L.

The motor 20A, the pinion 58, the rack 57, the lens holding frame 56, the lens fixing frame 52, the pins 60, and the guiding groove 61 constitute the zoom lens group driving mechanism that moves at least one zoom lens group among the plurality of zoom lens groups, which are included in the zoom lens device, in the direction of the optical axis L, in response to the zoom command. Further, the motor 20B, the gear 54, the lens fixing frame 52, and the lens holding frame 56 constitute a lens rotating mechanism that rotates at least one lens of two or more lenses, which constitute the zoom lens groups, about an optical axis of the zoom lens groups, relative to lenses other than the at least one lens of the zoom lens groups.

A lens fixing frame 72, of which the inner peripheral surface is fixed onto the outer peripheral surface of the lens 71, is mounted on the outer peripheral surface of the lens 71. One end of a plurality of pins 70 is fixed onto the lens fixing frame 72. The other end of these pins 70 is inserted into a guiding groove 61 which is formed in a barrel 62 of the zoom optical system 5. By moving the pins 70 along the guiding groove 61, the lens fixing frame 72 (lens 71) is able to move in the direction of the optical axis L.

A rack 77, which protrudes in the direction of the optical axis L, is formed on a part of the lens fixing frame 72. Teeth 77A formed on the rack 77 engages with a pinion 78. A shaft of the above-mentioned motor 20A is fixed onto the pinion 78. If the motor A is driven, the pinion 78 rotates, and the rack 77 moves in the direction of the optical axis L. Therefore, the lens 71 also moves in the direction of the optical axis L.

The motor 20A, which moves the lens 51 in the direction of the optical axis L, and the motor 20A, which moves the lens 71 in the direction of the optical axis L, are represented by the same reference numeral. However, each motor 20A can be separately driven. Thus, it is needless to say that the lens 51 and the lens 71 can be moved by different distances in the direction of the optical axis L.

As described above, the lens 51 and the lens 71 are lenses that constitute the power system lens 3 and the correction system lens 4 constituting the zoom optical system 5.

Figure 6:
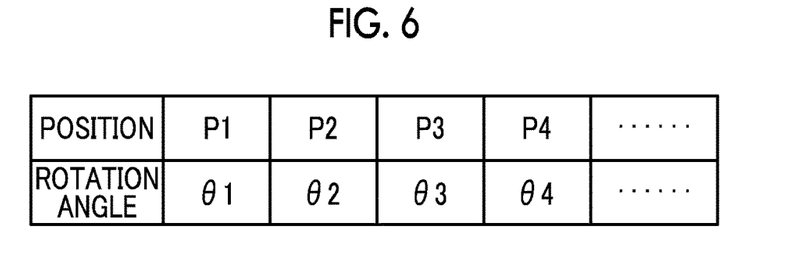
FIG. 6 is an example of a table of positions and rotation angles.

FIG. 6 is an example of a position/rotation angle table illustrating a relationship between positions of the lens 51 and rotation angles of the lens 51.

In this example, the plurality of positions of the lens 51 (zoom lens group) in the direction of the optical axis L and the plurality of rotation angles respectively corresponding to the plurality of positions are stored in the memory (storage section) 42 as the position/rotation angle table. If the lens 51 is set at the position in the direction of the optical axis L, the lens rotating mechanism rotates the lens 51 about the optical axis L by a rotation angle which is stored in association with the set position. As described above, the lens rotating mechanism can be driven separately from the lens moving mechanism by rotating at least one lens, which is included in the optical system, in the optical axis L of the optical system, by a rotation angle, which corresponds to a position of the lens moved by the lens moving mechanism in the direction of the optical axis L, among the plurality of rotation angles stored in the memory (storage section) 42. For example, if the lens 51 is set at a position P1, the lens 51 is rotated by an angle of θ1. It is needless to say that the reference position of the lens 51 in the rotation direction is set and the rotation is performed by the motor 20B on the basis of the reference position. If necessary, a reference mark is attached to the lens fixing frame 52, and a sensor detects the mark, whereby the lens 51 can be rotated on the basis of the rotation reference position of the lens 51 and the rotation angle which is determined on the basis of the rotation reference position. An amount of rotation of the lens, which is rotated by the lens rotating mechanism, is determined in accordance with an amount of zooming of the zoom optical system 5 such that a value of astigmatism of the entire zoom optical system 5 (zoom lens device) is equal to or less than a threshold value.

For example, the position/rotation angle table stores a relationship between the rotation angles and the positions in the direction of the optical axis L such as minimizes (reduces) aberrations by rotating the lens. By rotating the lens in accordance with the set position, aberrations in the television camera lens 1 are reduced. It is needless to say that if there are lenses which are rotated other than the lens 51, the rotation angle of the lens 51 is determined such that aberration is reduced in consideration of the rotation angles of the other lenses.

Figure 7:
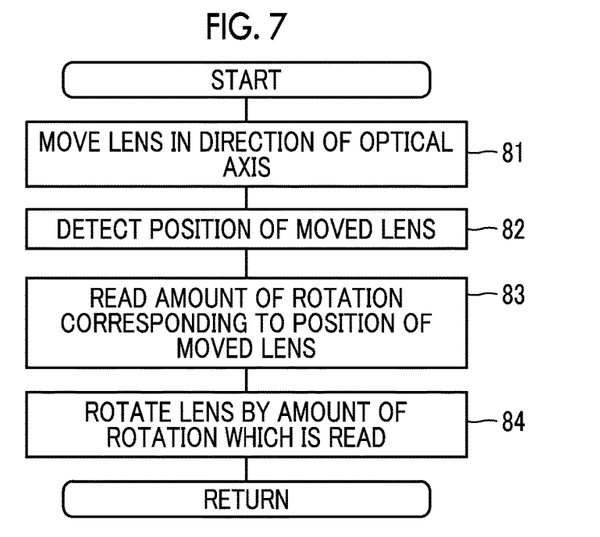
FIG. 7 is a flowchart illustrating a procedure of lens control processes.

FIG. 7 is a flowchart illustrating a procedure of control processes of the zoom optical system (zoom lens device) 5.

If the zoom command is given from the zoom button 46 to the control circuit 40, in response to the zoom command, as described above, a lens, which is included in a zoom lens group included in the zoom optical system 5, is moved in the direction of the optical axis L (step 81). The detector 17 detects a position of the lens moved in the direction of the optical axis L (step 82), and the amount of rotation of the lens corresponding to the position of the moved lens is read from the position/rotation angle table (step 83). The lens is rotated by the read amount of rotation (step 84).

The entire zoom lens group including a lens, which is rotatable, may rotate about the optical axis L, and may not rotate. In a case where the entire zoom lens group including the lens which is rotatable rotates about the optical axis L, the lens is rotated by an amount of rotation which is obtained by adding the amount of rotation of the zoom lens group to the amount of rotation read from the position/rotation angle table.

Figure 8:
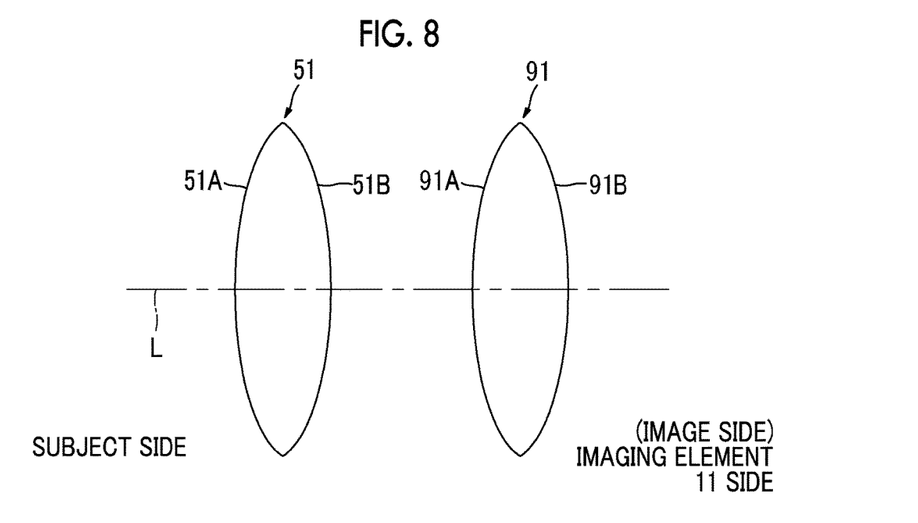
FIG. 8 shows a first lens and a second lens.

FIG. 8 shows a first lens 51 and a second lens 91 that calculate the zoom optical system 5 (zoom lens device).

Either the first lens 51 or the second lens 91 may be either the variable power system lens 3 or the correction system lens 4. Further, either the first lens 51 or the second lens 91 is rotatable about the optical axis L as described above.

The first lens 51 and the second lens 91 are adjacent to each other, and the adjacent first lens 51 and the second lens 91 are rotated by the rotation angles corresponding to the positions thereof in the direction of the optical axis L. In a manner similar to the first lens 51, in the second lens 91, a table, which indicates a relationship between the rotation angle and the position of the direction of the optical axis L as shown in FIG. 6, is stored in the memory 42, and the second lens 91 is rotated by a rotation angle corresponding to the second lens 91. The first lens 51 and the second lens 91 may not be adjacent to each other.

In FIG. 8, the first lens 51 is disposed to be closer to the subject side, and the second lens 91 is disposed to be closer to the imaging element 11 side (image side).

The first lens 51 has two optical function surfaces 51A and 51B which are curved surfaces. The optical function surface 51A of the two optical function surfaces 51A and 51B, which has a larger difference between a maximum value and a minimum value of curvatures of the curved surfaces of the optical function surfaces 51A and 51B in a direction of circumference centered on the optical axis L, is set to be closer to the subject side. Further, the second lens 91 has two optical function surfaces 91A and 91B which are curved surfaces. The optical function surface 91B of the optical function surfaces 91A and 91B, which has a larger difference between a maximum value and a minimum value of curvatures of the curved surfaces of the optical function surfaces 91A and 91B in the direction of circumference centered on the optical axis L, is set to be closer to the image side.

In an example shown in FIG. 8, the first lens 51 and the second lens 91 are adjacent to each other, but may not be adjacent to each other.

Further, among two or more lenses constituting the zoom lens groups, a lens having a curved surface (optical function surface), of which a curvature is a maximum value, and a lens having a curved surface, of which a curvature is a minimum value, may be rotated.

As shown in FIG. 8, in a case where the first lens 51 is disposed to be closer to the subject side than the second lens 91, the optical function surface of the two optical function surfaces 51A and 51B of the first lens 51, the optical function surface having a larger difference between a maximum value and a minimum value of curvatures of the curved surfaces in the direction of circumference centered on the optical axis L, may be set to be closer to the image side. In this case, the optical function surface of the two optical function surfaces 91A and 91B of the second lens 91, the optical function surface having a larger difference between a maximum value and a minimum value of curvatures of the curved surfaces of the optical function surfaces 91A and 91B in the direction of circumference centered on the optical axis L, is set to be closer to the subject side.

Further, the above-mentioned lens rotating mechanism may rotate the first lens 51 and the second lens 91 in directions opposite to each other, and may rotate the lenses in the same direction.

It is preferable that the lens, which is rotated by the lens rotating mechanism, has a relatively large astigmatism, among the lenses constituting the zoom lens device.

The lens, which is rotated by the lens rotating mechanism, may be a lens which has a value of astigmatism larger than an average value of astigmatism of the lenses constituting the zoom lens device, or a lens which has a value of astigmatism larger than a median value of astigmatism of the lenses constituting the zoom lens device.

Movement of at least one zoom lens group moved by the zoom lens group driving mechanism may interlock with rotation of at least one lens rotated by the lens rotating mechanism. In order to perform the above-mentioned operation, the above-mentioned motors 20A and 20B are controlled by the control circuit 40.

As described above, in a case of rotating at least two lenses of the first lens 51 and the second lens 91, such at least two lenses may constitute the same zoom lens group, and may constitute different zoom lens groups.

The lens, which is rotated by the lens rotating mechanism, may be a single lens. In such a case, the single lens may be rotated in a range of a rotation angle of 180 degrees.

Furthermore, the first lens 51 may be rotated in a range of a rotation angle of 90 degrees, and the second lens 91 may be rotated in a range of a rotation angle of 90 degrees in a direction opposite to a direction of rotation of the first lens 51.

What is claimed is:

1. A zoom lens device that includes a plurality of zoom lens groups each of which is formed of two or more lenses, the zoom lens device comprising:
    a lens rotating mechanism that rotates at least one lens of two or more lenses, which constitute one zoom lens group of the plurality of zoom lens groups and that an optical axis is common in the optical axis of the zoom lens group, about the optical axis of the zoom lens groups, relative to lenses other than the at least one lens of the one zoom lens group of the plurality of lens groups;
    a zoom lens group driving mechanism that moves at least one zoom lens group among the plurality of zoom lens groups, which are included in the zoom lens device, in a direction of the optical axis, in response to a zoom command;
    a memory that stores the plurality of rotation angles respectively corresponding to the plurality of positions of the zoom lens group in the direction of the optical axis; and
    a control mechanism that reads a rotation angle corresponding to a position of the zoom lens group in the direction of the optical axis from the memory and controls the lens rotating mechanism such that the at least one lens is rotated about the optical axis by the read rotation angle.

2. The zoom lens device according to claim 1, wherein the lens rotating mechanism rotates two lenses which are a first lens and a second lens adjacent to each other.

3. The zoom lens device according to claim 2,
    wherein the first lens is disposed to be closer to a subject side than the second lens is,
    wherein the first lens has two optical function surfaces which are curved surfaces, each of the curved surfaces having a minimum value of curvature and a maximum value of curvature, and an optical function surface of the two optical function surfaces, which has a larger difference between the maximum value of curvature and the minimum value of curvature of the each of the curved surfaces in a direction of circumference centered on the optical axis, is set to be closer to the subject side, and
    wherein the second lens has two optical function surfaces which are curved surfaces, and an optical function surface of the two optical function surfaces, which has a larger difference between a maximum value and a minimum value of curvatures of the curved surfaces in a direction of circumference centered on the optical axis, is set to be closer to an image side.

4. The zoom lens device according to claim 2,
    wherein the first lens is disposed to be closer to a subject side than the second lens is,
    wherein the first lens has two optical function surfaces which are curved surfaces, each of the curved surfaces having a minimum value of curvature and a maximum value of curvature, and an optical function surface of the two optical function surfaces, which has a larger difference between the maximum value of curvature and the minimum value of curvature of the each of the curved surfaces in a direction of circumference centered on the optical axis, is set to be closer to an image side, and
    wherein the second lens has two optical function surfaces which are curved surfaces, and an optical function surface of the two optical function surfaces, which has a larger difference between a maximum value and a minimum value of curvatures of the curved surfaces in a direction of circumference centered on the optical axis, is set to be closer to the subject side.

5. The zoom lens device according to claim 2, wherein the lens rotating mechanism rotates the first lens and the second lens in directions opposite to each other.

6. The zoom lens device according to claim 5, wherein the lens rotating mechanism rotates the first lens in a range of a rotation angle of 90 degrees, and rotates the second lens in a range of a rotation angle of 90 degrees in a direction opposite to a direction of rotation of the first lens.

7. The zoom lens device according to claim 1, wherein the lens, which is rotated by the lens rotating mechanism, has a larger value of astigmatism relative to the lenses constituting the zoom lens device.

8. The zoom lens device according to claim 1, wherein the lens, which is rotated by the lens rotating mechanism, is a lens which has a value of astigmatism larger than an average value of astigmatism of the lenses constituting the zoom lens device, or a lens which has a value of astigmatism larger than a median value of astigmatism of the lenses constituting the zoom lens device.

9. The zoom lens device according to claim 1, wherein an amount of rotation of the lens, which is rotated by the lens rotating mechanism, is determined in accordance with an amount of zooming of the zoom lens device such that a value of astigmatism of the entire zoom lens device is equal to or less than a threshold value.

10. The zoom lens device according to claim 1, wherein movement of at least one zoom lens group moved by the zoom lens group driving mechanism interlocks with rotation of at least one lens rotated by the lens rotating mechanism.

11. The zoom lens device according to claim 1, wherein the lens rotating mechanism rotates at least two lenses, and the at least two lenses constitute the same zoom lens group.

12. The zoom lens device according to claim 1, wherein the lens rotating mechanism rotates at least two lenses, and the at least two lenses constitute the zoom lens groups which are different.

13. The zoom lens device according to claim 1,
wherein the lens, which is rotated by the lens rotating mechanism, is a single lens, and
wherein the single lens is rotated in a range of a rotation angle of 180 degrees.

14. The zoom lens device according to claim 1, wherein the lens rotating mechanism rotates a lens having a curved surface, of which a curvature is a maximum value, and a lens having a curved surface, of which a curvature is a minimum value, among two or more lenses constituting the zoom lens groups.

15. A method for controlling a zoom lens device that includes a plurality of zoom lens groups each of which is formed of two or more lenses, the method comprising:
causing a lens rotating mechanism to rotate at least one lens of two or more lenses, which constitute one zoom lens group of the plurality of zoom lens groups and that an optical axis is common in the optical axis of the zoom lens group, about the optical axis of the zoom lens groups, relative to lenses other than the at least one lens of the one zoom lens group of the plurality of zoom lens groups;
causing a zoom lens group driving mechanism to move at least one zoom lens group among the plurality of zoom lens groups, which are included in the zoom lens device, in a direction of the optical axis, in response to a zoom command;
causing a memory to store a plurality of rotation angles respectively corresponding to the plurality of positions of the zoom lens group in the direction of the optical axis; and
causing a control mechanism to read a rotation angle corresponding to a position of the zoom lens group in the direction of the optical axis from the memory and control the lens rotating mechanism such that the at least one lens is rotated about the optical axis by the read rotation angle.

* * * * *